United States Patent
Okabe et al.

(10) Patent No.: US 7,612,921 B2
(45) Date of Patent: Nov. 3, 2009

(54) PRINT JOB MANAGEMENT APPARATUS AND PRINT JOB MANAGEMENT METHOD

(75) Inventors: Hiroki Okabe, Nagano-ken (JP); Nobuhisa Takabayashi, Nagano-ken (JP); Mikiya Shimada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 950 days.

(21) Appl. No.: 10/816,416

(22) Filed: Mar. 31, 2004

(65) Prior Publication Data
US 2004/0257613 A1 Dec. 23, 2004

(30) Foreign Application Priority Data
Apr. 2, 2003 (JP) .............................. 2003-099597

(51) Int. Cl.
H04N 1/00 (2006.01)
H04N 1/40 (2006.01)
G06K 15/00 (2006.01)
G06F 15/167 (2006.01)
G06F 15/173 (2006.01)

(52) U.S. Cl. ...................... 358/403; 358/1.16; 358/444; 709/215; 709/226

(58) Field of Classification Search .................. 358/518, 358/519, 1.9, 1.15, 448, 1.13, 1.8, 1.12, 1.2, 358/1.14, 1.16, 403, 444; 399/26; 382/100, 382/167; 348/195; 709/215, 226
See application file for complete search history.

(56) References Cited

U.S. PATENT DOCUMENTS

| | | | | |
|---|---|---|---|---|
| 5,717,841 A | * | 2/1998 | Farrell et al. ................ | 358/1.15 |
| 5,768,483 A | * | 6/1998 | Maniwa et al. ............. | 358/1.15 |
| 5,819,015 A | * | 10/1998 | Martin et al. .............. | 358/1.15 |
| 5,905,906 A | * | 5/1999 | Goffinet et al. ................ | 710/8 |
| 6,115,132 A | * | 9/2000 | Nakatsuma et al. ........ | 358/1.14 |

(Continued)

FOREIGN PATENT DOCUMENTS

JP 09-269879 10/1997

(Continued)

OTHER PUBLICATIONS

Abstract of Japanese Patent Publication No. 09-269879, Pub. Date: Oct. 14, 1997, Patent Abstracts of Japan.

(Continued)

*Primary Examiner*—Twyler L Haskins
*Assistant Examiner*—Jonathan R Beckley
(74) *Attorney, Agent, or Firm*—Martine Penilla & Gencarella, LLP (57) ABSTRACT

The technique of the invention retrieves any print job of redundant image data having identical image identification data with the image identification data of an object job, which is specified among print jobs stored in a print server, deletes image data present on a reference path of the retrieved print job, and overwrites the reference path of the retrieved print job with a reference path of the object job. The print job in which the image data was deleted is executed by utilizing the common reference path to read remaining image data and converting the image data into print data printable with a printer. This arrangement desirably prevents identical image data from being stored redundantly and thereby effectively saves the storage capacity of print jobs.

14 Claims, 8 Drawing Sheets

U.S. PATENT DOCUMENTS

| | | | | |
|---|---|---|---|---|
| 6,157,465 | A * | 12/2000 | Suda et al. | 358/407 |
| 6,213,652 | B1 * | 4/2001 | Suzuki et al. | 358/1.15 |
| 6,385,728 | B1 * | 5/2002 | DeBry | 726/9 |
| 6,441,920 | B1 * | 8/2002 | Smith | 358/1.2 |
| 6,477,580 | B1 * | 11/2002 | Bowman-Amuah | 709/231 |
| 6,498,656 | B1 * | 12/2002 | Mastie et al. | 358/1.15 |
| 6,539,396 | B1 * | 3/2003 | Bowman-Amuah | 707/103 R |
| 6,567,180 | B1 * | 5/2003 | Kageyama et al. | 358/1.15 |
| 6,578,068 | B1 * | 6/2003 | Bowman-Amuah | 709/203 |
| 6,583,890 | B1 * | 6/2003 | Mastie et al. | 358/1.18 |
| 6,600,569 | B1 * | 7/2003 | Osada et al. | 358/1.12 |
| 6,606,163 | B1 * | 8/2003 | Suzuki et al. | 358/1.15 |
| 6,615,253 | B1 * | 9/2003 | Bowman-Amuah | 709/219 |
| 6,628,417 | B1 * | 9/2003 | Naito et al. | 358/1.15 |
| 6,650,433 | B1 * | 11/2003 | Keane et al. | 358/1.15 |
| 6,775,023 | B1 * | 8/2004 | Fukunaga et al. | 358/1.15 |
| 6,894,792 | B1 * | 5/2005 | Abe | 358/1.15 |
| 6,921,220 | B2 * | 7/2005 | Aiyama | 400/76 |
| 6,980,668 | B1 * | 12/2005 | Naito et al. | 382/100 |
| 7,075,666 | B1 * | 7/2006 | Aiyama | 358/1.13 |
| 7,130,068 | B1 * | 10/2006 | Ohta | 358/1.15 |
| 7,136,941 | B2 * | 11/2006 | Nguyen et al. | 710/15 |
| 7,170,620 | B2 * | 1/2007 | Gassho et al. | 358/1.15 |
| 7,232,267 | B2 * | 6/2007 | Uchida | 400/62 |
| 7,248,385 | B2 * | 7/2007 | Murakami et al. | 358/1.18 |
| 7,265,866 | B2 * | 9/2007 | Holmstead et al. | 358/1.16 |
| 7,373,409 | B2 * | 5/2008 | Miyake et al. | 709/229 |
| 2002/0060806 | A1 * | 5/2002 | Gassho et al. | 358/1.15 |
| 2003/0093675 | A1 * | 5/2003 | Hibino et al. | |

FOREIGN PATENT DOCUMENTS

| | | |
|---|---|---|
| JP | 11-212738 | 8/1999 |
| JP | 2002-024060 | 1/2002 |

OTHER PUBLICATIONS

Abstract of Japanese Patent Publication No. 11-212738, Pub. Date: Aug. 6, 1999, Patent Abstracts of Japan.

Abstract of Japanese Patent Publication No. 2002-024060, Pub. Date: Jan. 25, 2002, Patent Abstracts of Japan.

* cited by examiner

Print Management Data

| Job ID | 1031 |
|---|---|
| Date of Job Acceptance | Month, Day, Hour, Minute |
| Reference Path of Image | .. /DATA/1031/dddd.tif |
| Paper Size | A4 |
| Paper Type | Luster |
| Image Layout | ***** |
| Specification of Printer | Not Specified |
| Execution Status | Print Queuing |
| ... | |
| Image Identification File | |
| Name of Image Data | dddd.tif |
| Size of Image Data | **** |
| Camera ID | CAM***** |
| Date of Photograghing | Month, Day, Hour, Minute |

Feb. 13, XXXX

| Job ID | Execution Status | Reference Path | Paper Specifications | | Printer Name | Job Acceptance Date |
|---|---|---|---|---|---|---|
| | | | Size | Type | | |
| 1031 | ○ | ../DATA/0031/dddd.tif | A4 | Luster | Auto | 2/13 |
| 1030 | ○ | ../DATA/0030/cccc.tif | A4 | Luster | Upper Printer | 2/13 |
| 1029 | ○ | ../DATA/0029/bbbb.tif | A4 | Matte | Lower Printer | 2/13 |
| 1028 | ✕ | ../DATA/0028/aaaa.tif | A4 | Matte | Upper Printer | 2/13 |
| 1027 | ○ | ../DATA/0027/dddd.tif | A4 | Luster | Auto | 2/6 |
| 1026 | ✕ | ../DATA/0026/cccc.tif | A3 | Luster | Auto | 2/6 |
| 1025 | ○ | ../DATA/0025/bbbb.tif | A4 | Matte | Lower Printer | 2/6 |
| 1024 | ◉ | ../DATA/0024/aaaa.tif | A4 | Matte | Auto | 1/31 |
| 1023 | ◉ | ../DATA/0023/dddd.tif | A4 | Luster | Auto | 1/31 |
| 1022 | ◉ | ../DATA/0022/cccc.tif | A4 | Luster | Upper Printer | 1/31 |
| 1021 | ◉ | ../DATA/0021/bbbb.tif | A4 | Matte | Lower Pritner | 1/24 |
| 1020 | ● | ../DATA/0028/aaaa.tif | A4 | Matte | Upper Pritner | 1/24 |
| 1019 | ● | ../DATA/0031/dddd.tif | A4 | Luster | Lower Pritner | 1/24 |
| 1018 | ● | ../DATA/0018/xxxx.tif | A3 | Luster | Auto | 1/13 |
| 1017 | ● | ../DATA/0017/zzzz.tif | A4 | Matte | Lower Printer | 1/13 |
| 1016 | ● | ../DATA/0016/yyyy.tif | A4 | Matte | Upper Pritner | 1/13 |

◉ : Printing   ⊞ : Standby   ○ : Print Queuing   ✕ : Pause   ● : Printed   UPDATE

PRINT JOB MANAGEMENT APPARATUS AND PRINT JOB MANAGEMENT METHOD

BACKGROUND OF THE INVENTION

1. Field of the Invention

The present invention relates to a print job management apparatus and a print job management method that manage print jobs which are executed by a printing device.

2. Description of the Prior Art

A print server for storing print jobs printed by a printer has been proposed as a print job management apparatus (see, for example, Japanese Patent Laid-Open Gazette No. 09-269879). This print server enables each print job stored therein to be reprinted by the printer, in response to a user's reprinting request.

The prior art print server requires a high-capacity storage device for storing print jobs of high-volume image data, such as photographic images. In such cases, the number of print jobs stored in the print server is restricted. This problem is found not only in the case of storage of print jobs for reprinting but in the case of storing newly received print jobs of high-volume image data and in the case of receiving storing a large number of print jobs simultaneously.

SUMMARY OF THE INVENTION

The object of the present invention is to provide a print job management apparatus and a corresponding method that save the storage capacity of print jobs to solve the problem of the prior art mentioned above. The object of the present invention is further to provide a print job management apparatus and a corresponding method that efficiently manage print jobs.

In order to achieve at least part of aforementioned objects, the present invention is structured as follows.

A print job management apparatus of the present invention is an apparatus that manages print jobs, which are executed by a printing device, the print job management apparatus including: a job acceptance module that receives each print job with image data; a job storage module that has a capacity of storing multiple print jobs received by the job acceptance module; a redundant data retrieval module that retrieves redundant image data among image data of print jobs stored in the job storage module; and a job status setting module that leaves at least one of the redundant image data retrieved by the redundant data retrieval module while deleting the other of the retrieved redundant image data, and sets a status of a print job in which the image data was deleted, to be executable with remaining image data by the printing device.

The print job management apparatus of the invention receives each print job with image data and stores the received print job into the job storage module, which has the capacity of storing multiple print jobs. The print job management apparatus retrieves redundant image data among image data of print jobs stored in the job storage module, and leaves at least one of the retrieved redundant image data while deleting the other of the retrieved redundant image data. The print job management apparatus sets the status of a print job in which the image data was deleted, to be executable with remaining image data by the printing device. The technique of the invention deletes redundant image data while ensuring execution of a print job in which the image data was deleted. This arrangement effectively saves the storage capacity of print jobs.

In one preferable application of the job management apparatus of the invention, each print job includes identification information for identifying the image data, and the redundant data retrieval module retrieves image data having identical identification information among the image data of the print jobs stored in the job storage module, as the redundant image data. Here, the identification information may include at least one of a file name of each image data, size of image data, identification information for identifying a digital camera used to record the image data, and date of recording the image data with the digital camera.

In another preferable application of the print job management apparatus of the invention, the job status setting module sets the status of the print job in which the image data was deleted, such that the remaining image data among the redundant image data is shared by a print job having the remaining image data and the print job in which the image data was deleted. In this application, each print job may be executable by the printing device by utilizing reference data, which is generated for reference to image data of the print job in the process of storage into the job storage module, to read the image data stored in the job storage module, and the job status setting module may overwrite reference data of the print job in which the image data was deleted, with reference data of a print job having the remaining image data among the redundant image data.

In still another preferable applications of the print job management apparatus of the invention, the job status setting module preferentially deletes image data stored earlier in the job storage module, or preferentially deletes printed image data, among the redundant image data.

In one preferable embodiment, the print job management apparatus of the invention further includes an image processing module that makes image data of each print job, which is stored in the job storage module, subjected to a preset series of image processing and thereby converts the image data into print data printable by the printing device, and the redundant data retrieval module and the job status setting module respectively execute the retrieval and the deletion and setting the status of the print job, while the image processing module is not activated.

In another preferable embodiment, the print job management apparatus of the invention further includes a job deletion module that deletes a print job stored in the job storage module at a preset timing. In this embodiment, the preset timing may be any of a timing when a total number of print jobs stored in the job storage module reaches a preset level, a timing when a total storage capacity of print jobs stored in the job storage module reaches a preset volume, and a timing when a duration of storage of each print job stored in the job storage module reaches a preset time period. As one application of this embodiment, the job deletion module may preferentially delete a print job stored earlier, among the print jobs stored in the job storage module.

The technique of the present invention is not restricted to the print job management apparatus described above, but is also applicable to a print job management method.

DESCRIPTION OF THE PREFERRED EMBODIMENTS

Figure 1:
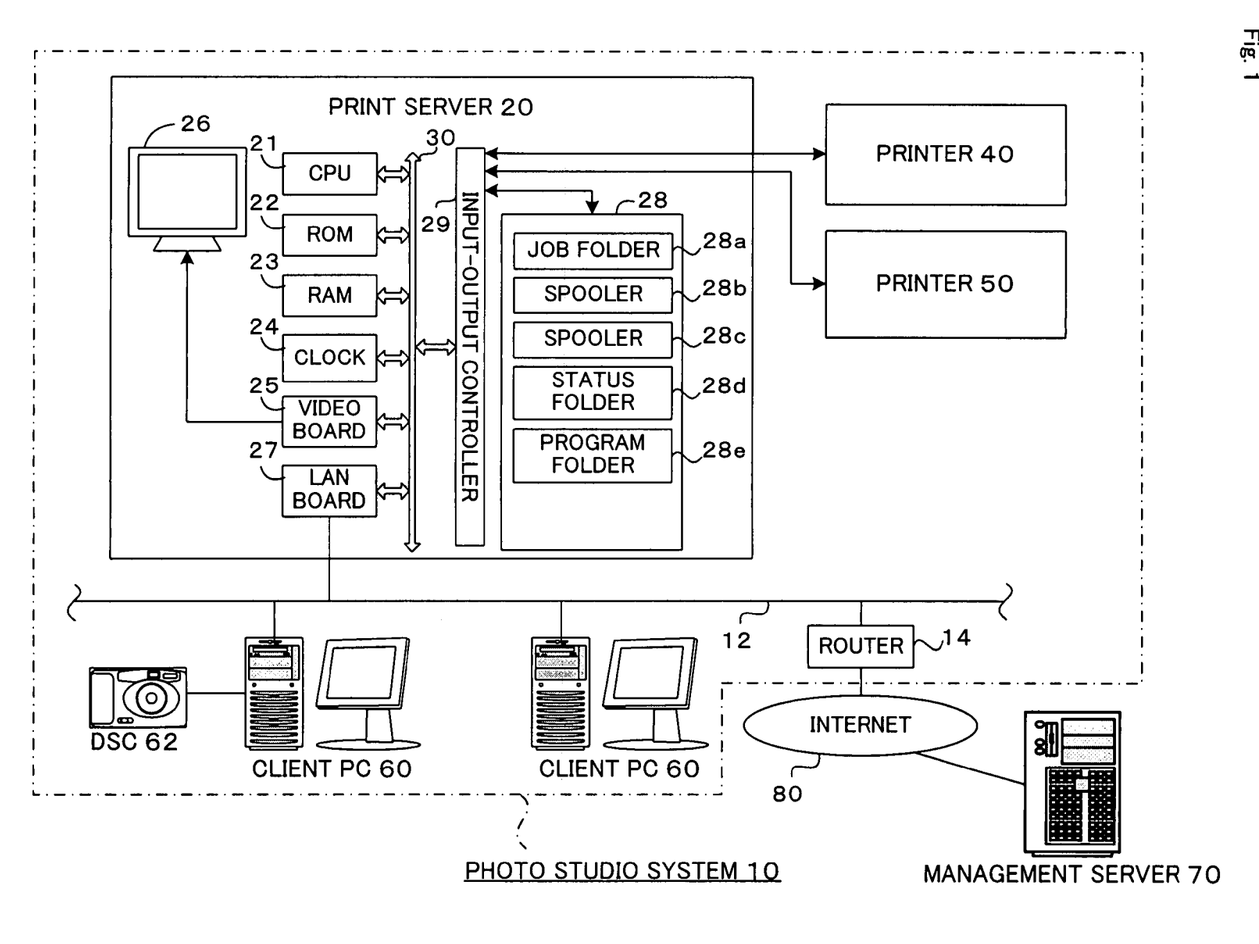
FIG. 1 schematically illustrates the configuration of a photo studio system 10.

One mode of carrying out the invention is discussed below as a preferred embodiment. FIG. 1 schematically illustrates the configuration of a photo studio system 10 that includes a print server 20 functioning as a print job management apparatus in one embodiment of the invention. The photo studio system 10 includes two printers 40 and 50, the print server 20 of the embodiment that connects with the two printers 40 and 50, and multiple client computers 60 that output print jobs of image data to the print server 20. The multiple client computers 60 are connected with the print server 20 via a LAN 12. The photo studio systems 10 are respectively located in multiple regions and are under management of a management server 70 connected via the Internet 80.

Each of the client computers 60 is constructed as a general computer. The client computer 60 is connected with a digital still camera 62 via, for example, a USB interface cable, to receive image data recorded with the digital still camera 62, and stores the input image data into a storage medium like a hard disk of the client computer 60.

The print server 20 of the embodiment is constructed as a general computer including a CPU 21. The CPU 21 is connected via a bus 30 with a ROM 22 that stores various processing programs, a RAM 23 that temporarily stores data, a clock generator 24 that generates an operation clock, a video board 25 that has a connector to a display 26, a LAN board 27 that has a connector to the LAN 12, and an input-output controller 29 that is linked with a hard disk 28 and the printers 40 and 50. The LAN board 27 is connected with a router 14 via the LAN 12. The print server 20 of the embodiment gains access to the Internet 80 via the router 14.

The hard disk 28 of the print server 20 in this embodiment has a job folder 28a that stores print jobs sent from the client computer 60, and spoolers 28b and 28c that respectively spool at most two print data or print jobs, which are printable with either of the printers 40 and 50 and include a currently executing print job. The hard disk 28 also has a status folder 28d that stores status data regarding the sizes and types of papers currently set in the printers 40 and 50, a state of paper jam, and the numbers of print jobs currently spooled in the spoolers 28b and 28c, and a program folder 28e that stores various processing programs.

Figure 2:
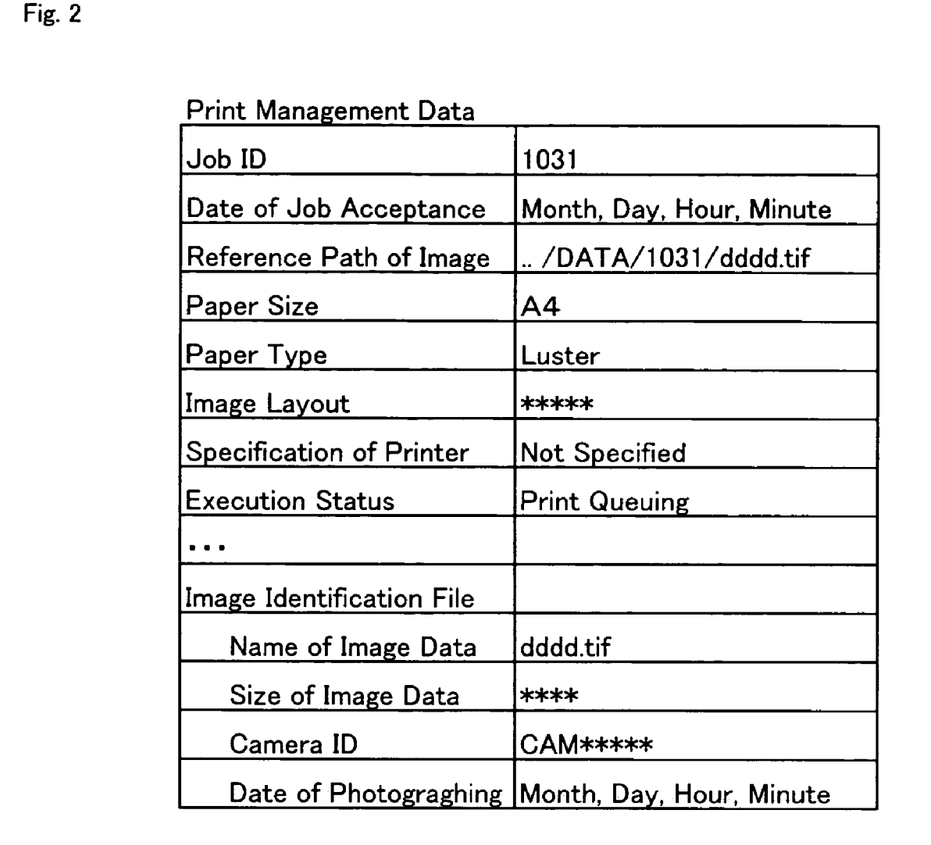
FIG. 2 shows an example of print management data.

Each of the print jobs stored in the job folder 28a of the hard disk 28 has an image file including object image data to be printed, a print management file including description of print management data regarding specifications of a paper size, a paper type, an image layout, and a printer used for printing, and an ICC profile. The image file has an image area for storing image data and an attribute information area for storing attribute information relating to the image data. The attribute information stored in the attribute information area includes, for example, the size of image data, identification information for identifying the digital still camera 62 used for taking the image data, and the date of taking the image data. In response to reception of a print job from any of the client computers 60, the print server 20 of the embodiment reads the attribute information from the attribute information area of the image file in the received print job and writes the attribute information as image identification data into the print management file. FIG. 2 shows an example of the print management data written in the print management file. As shown in FIG. 2, the print management data includes a job ID uniquely allocated to each print job, the date of job acceptance, a reference path, specifications of a paper size, a paper type, an image layout, and a printer, an execution status of the print job, and image identification data. The image identification data includes the name of an image file, the size of image data, a camera ID, and the date of photographing.

The processing programs stored in the program folder 28e of the hard disk 28 include printer drivers executed to control the printers 40 and 50 respectively, a color converter executed to generate a color correction table based on an ICC profile of a selected printer for printing and an ICC profile of object image data and to carry out color correction of the object image data with the generated color correction table, and a Web browser executed to browse various pieces of information.

Figure 8:
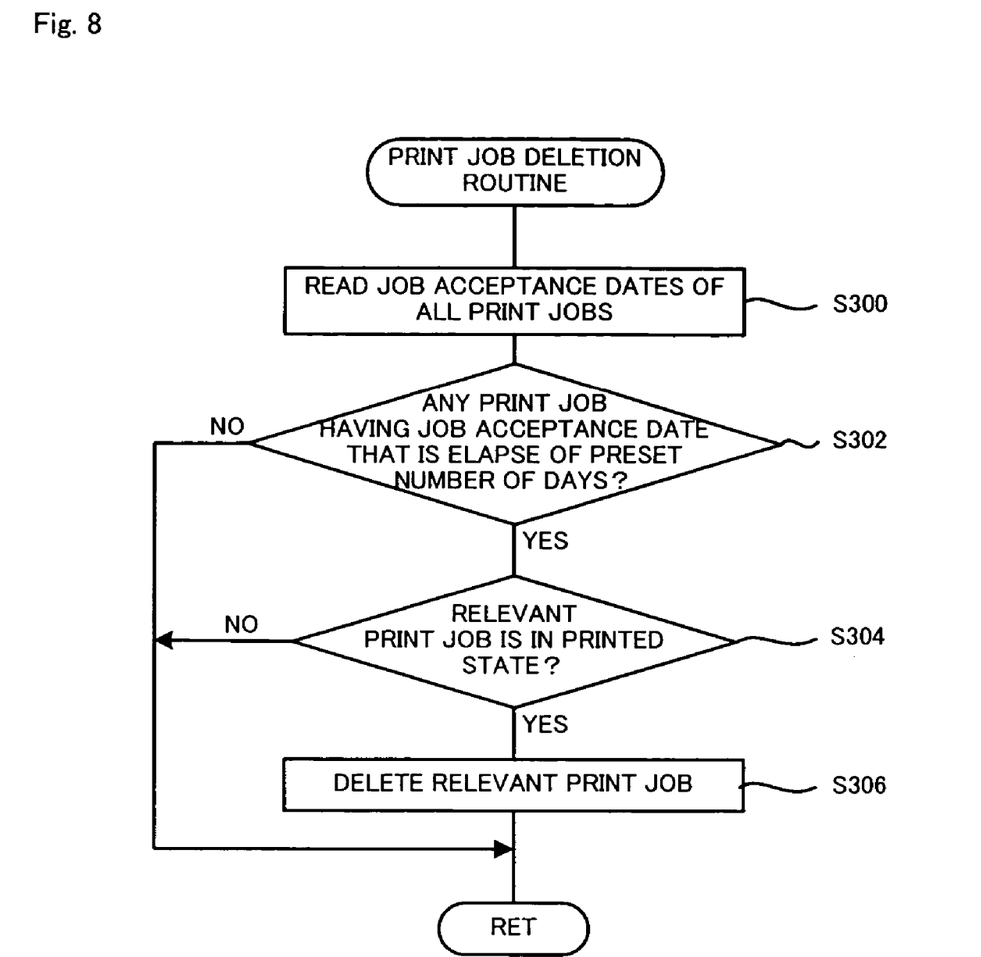
FIG. 8 is a flowchart showing a print job deletion routine.

The description now regards the operations of the photo studio system 10 constructed as discussed above, especially the operations of the print server 20 of the embodiment. A print job acceptance routine shown in the flowchart of FIG. 3, a print job management routine shown in the flowchart of FIG. 6, and a print job deletion routine shown in the flowchart of FIG. 8 are successively described as the operations of the print server 20 of the embodiment.

The print job acceptance routine is activated, in response to reception of a signal representing transmission of a print job from one of the client computers 60. When the print job acceptance routine shown in the flowchart of FIG. 3 starts, the CPU 21 of the print server 20 of the embodiment receives a print job sent from the client computer 60 (step S100), allocates a job ID to the received print job (step S102), and stores the print job with the allocated job ID into the job folder 28a of the hard disk 28 (step S104). The print job acceptance routine is then terminated. The job ID is allocated to each print job in the order of reception and is written into the print management file. FIG. 4 shows image files and print management files of print jobs stored in the job folder 28a. In the illustrated example of FIG. 4, ID folders identified by job IDs as folder names are created in a directory 'DATA', which is a lower hierarchy of a directory 'JOB' in the job folder 28a. Each image file is stored in the corresponding ID folder. Print management files identified by job IDs as file names are stored in a directory 'MANAGE', which is also the lower hierarchy of the directory 'JOB' in the job folder 28a. The print job execution procedure of this embodiment reads object image data by referring to a reference path (shown in brackets in FIG. 4) written in a corresponding print management file, and converts the object image data into print data printable with a selected one of the printers 40 and 50.

When each received print job is stored in the job folder 28a according to the print job acceptance process discussed above, it is determined whether the paper size and the paper type specified in the print job are consistent with the paper size and the paper type currently set in either of the printers 40 and 50. In the case of consistency, the execution status of the print job is set to a print queuing state. In the case of inconsistency, on the other hand, the execution status of the print job is set to a pause state. When the paper size and the paper type set in either of the printers 40 and 50 are changed to be consistent with the paper size and the paper type specified in the print job, the execution status of the print job is changed from the pause state to the print queuing state. When the print job set in the print queuing state is present in the job folder 28a, it is determined whether either of the spoolers 28b and 28c corresponding to the printers 40 and 50 has any vacancy for spooling new print data. The print job in the print queuing state is allocated to a selected printer corresponding to the spooler having any vacancy for spooling new print data. The execution status of the print job is then changed from the print queuing state to an allocated state. In response to allocation of the print job to the selected printer, the procedure generates a color correction table based on the ICC profile of the selected printer and the ICC profile of the print job, reads object image data to be printed by referring to the reference path of the print job, and carries out color correction of the object image data with the generated color correction table. The procedure activates the printer driver corresponding to the selected printer to make the color-converted image data subjected to color conversion into CMYK data and a halftoning process and converted into print data printable with the selected printer. The converted print data is transferred as a standby print job to the spooler corresponding to the selected printer. On completion of a currently executing print job, each of the spoolers 28*b* and 28*c* outputs print data spooled therein as a standby print job to the corresponding one of the printers 40 and 50 to start printing. The execution status of the print job is then changed from the allocated state to a printing state. On completion of execution of the print job, the execution status of the completed print job is changed from the printing state to a printed state. The execution status of the print job is written into the print management file of the print job stored in the job folder 28*a*. Even after completion of printing with either of the printers 40 and 50, the print job in the printed state is kept in the job folder 28*a* for reprinting.

Figure 5:
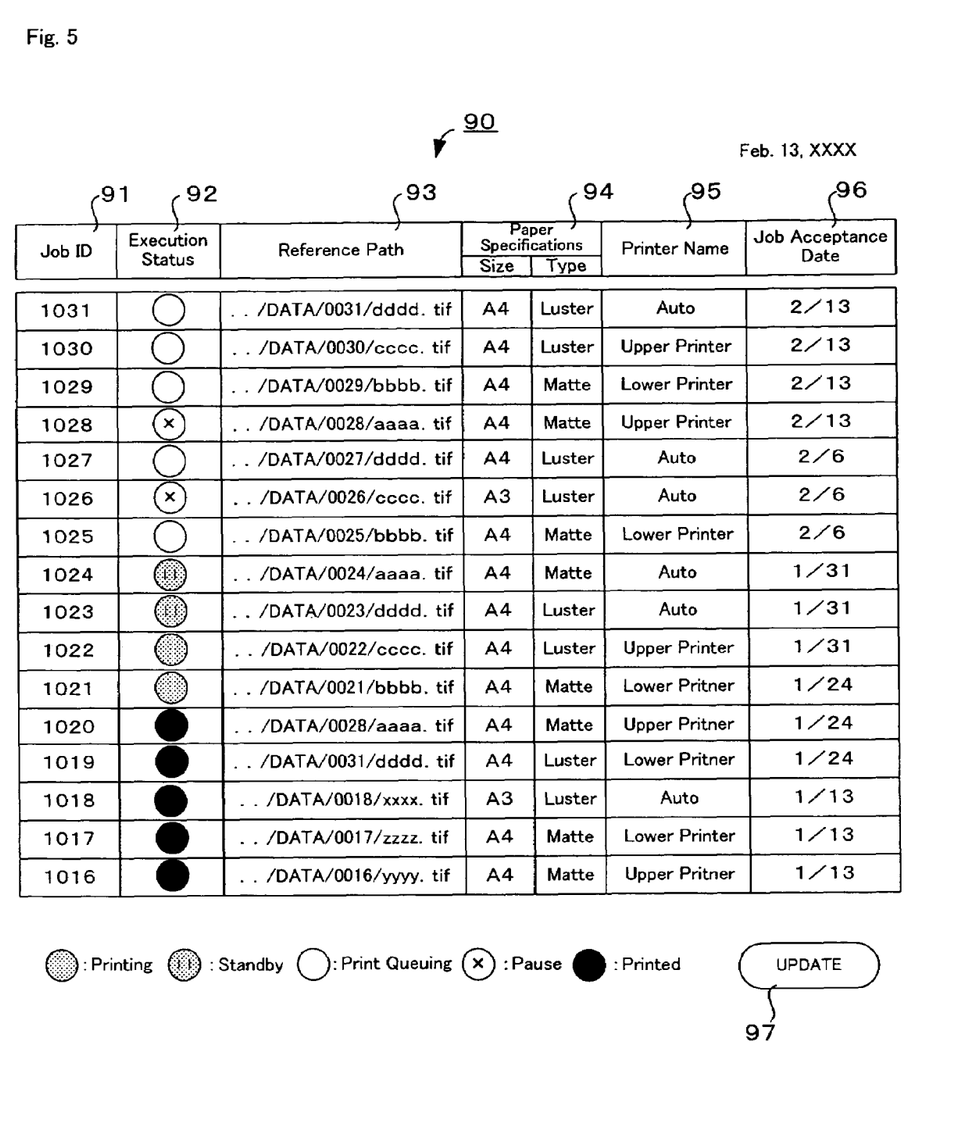
FIG. 5 shows an example of a job execution status display window 90.

In response to a requirement from the print server 20 or each of the client computers 60, data regarding the execution statuses of respective print jobs are read from the corresponding print management files stored in the job folder 28*a* and are provided in the form of a Web page. FIG. 5 shows a job execution status display window 90 opening on a display of the print server 20 or on a display of each client computer 60. The job execution status display window 90 includes a job ID display column 91 showing job IDs of respective print jobs, an execution status display column 92 showing execution statuses of the respective print jobs, a reference path display column 93 showing reference paths of object image data to be printed, a paper specifications display column 94 showing specifications of paper size and paper type in the respective print jobs, a printer name display column 95 showing names of specified printers, a job acceptance date display column 96 showing dates of acceptance of the respective print jobs, and an update button 97 to effectuate new entries regarding, for example, the execution statuses and the paper specifications of the print jobs. For the better understanding, different symbols of 'Printing' state, 'Standby' state, 'Print Queuing' state, 'Pause' state, and 'Printed' state are set corresponding to the 'printing state', the 'allocated state', the 'print queuing state', the 'pause state', and the 'printed state' discussed above and are shown in the execution status display column 92 of the respective print jobs on the job execution status display window 90 of FIG. 5. In the actual display, however, these states are distinctly shown in color lighting: for example, blinking green circle for the 'Printing' state, lighting green circle for the 'Standby' state, lighting yellow circle for the 'Print Queuing' state, lighting orange circle for the 'Pause' state, and lighting black circle for the 'Printed' state. In the illustrated example of FIG. 5, the user is allowed to open a pulldown menu and enter a selected state in the execution status display column 92. A change of the execution status of a print job from the 'printed state' to the 'print queuing state' enables the print job in the printed state to be reprinted as the print job in the print queuing state with either of the printers 40 and 50.

The print job management routine is repeatedly executed while no print job is executed, that is, when no print job in the printing queuing state is present in the job folder 28*a*. Execution of this print job management routine only during non-execution of any print job effectively protects the print server 20 from excessive processing load. When the print job management routine shown in the flowchart of FIG. 6 starts, the CPU 21 of the print server 20 of the embodiment successively specifies a latest print job having a largest job ID number as an object job and reads image identification data for identifying object image data included in the object job from its corresponding print management file (step S200). The CPU 21 then retrieves any print job having identical image identification data with the image identification data of the specified object job (step S202). The image identification data includes the name of an image file, the size of image data, the camera ID, and the date of photographing as shown in FIG. 2. Two image data having identical image identification data mean that the two image data were taken with an identical digital still camera 62 on an identical date and have an identical data size and an identical file name. Namely these two image data are regarded as identical. Retrieval of any print job having identical image identification data accordingly determines whether any print job having redundant image data has been received in the past.

Figure 7:
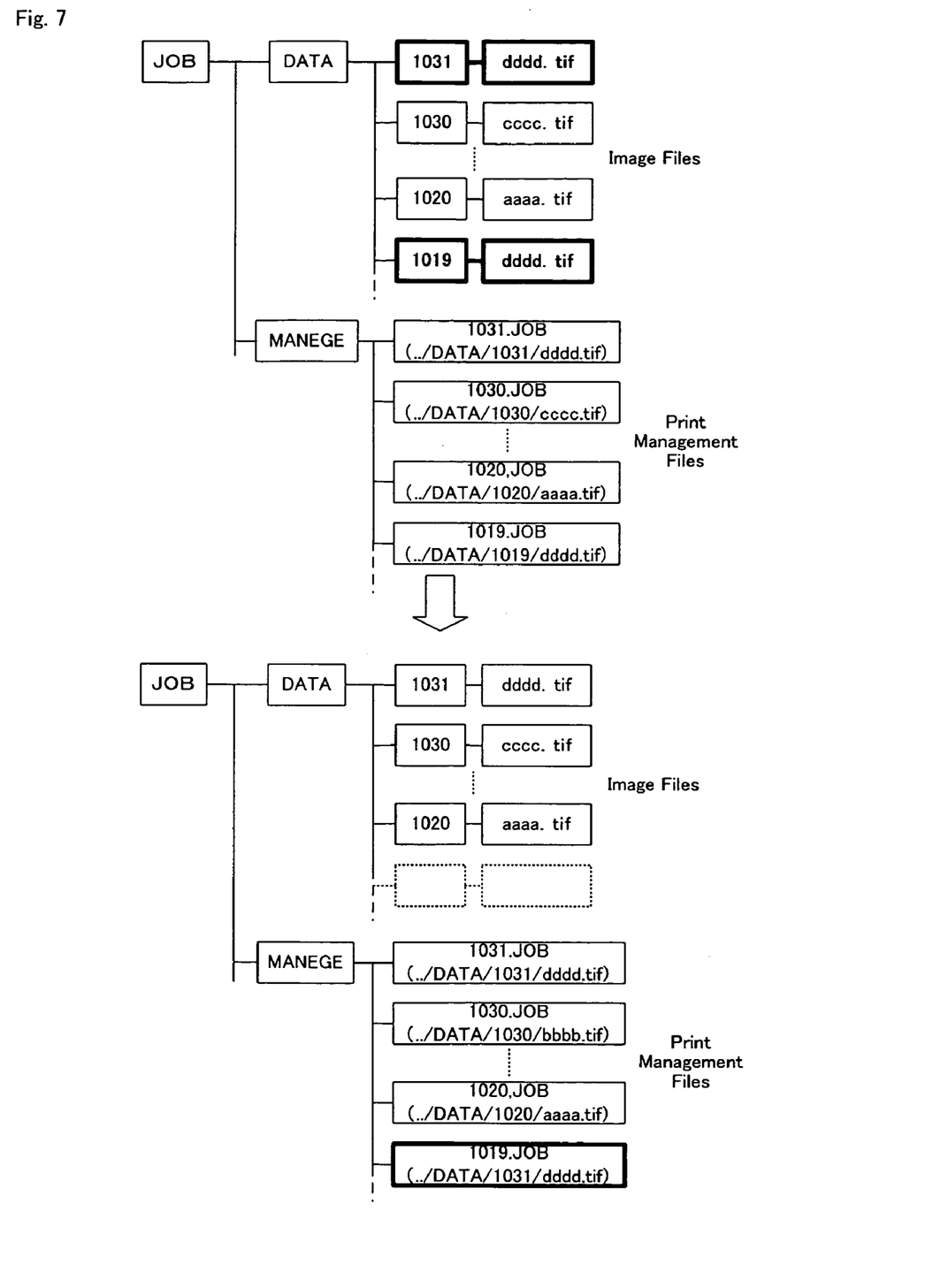
FIG. 7 shows deletion of redundant image data.

When any print job having the identical image identification data is hit as a result of retrieval at step S204, the CPU 21 determines whether the execution status of the retrieved print job is in the printed state (step S206). When the retrieved print job is set in the printed state, the CPU 21 deletes image data present on the reference path of the corresponding print management file of the retrieved print job (step S208) and overwrites the reference path of the print management file of the retrieved print job with the reference path of the print management file of the object job specified at step S200 (step S210). This process leaves only image data of the object job among multiple print jobs having redundant image data, while deleting the redundant image data of the other print job. The other print job with the deleted image data is executable by referring to the image data of the object job. This arrangement effectively prevents identical image data from being stored redundantly in the job folder 28*a* and thus desirably saves the storage capacity of print jobs. FIG. 7 shows deletion of redundant image data. In the illustrated example of FIG. 7, image data 'dddd.tif' of a print job (object job) with job ID '1031' is identical with image data 'dddd.tif' of a print job with job ID '1019'. The process accordingly deletes the image data of the print job with the job ID '1019' and overwrites the reference path (shown in brackets in FIG. 7) of the print management file of the print job with the job ID '1019' with the reference path of the object job with the job ID '1031'. The print job with the job ID '1019' is executed by reading the image data of the print job with the job ID '1031' from the overwritten reference path. Namely the image data present on the reference path '. . /DATA/1031/dddd.tif' is shared by the print job with the job ID '1031' and the print job with the job ID '1019'.

Figure 6:
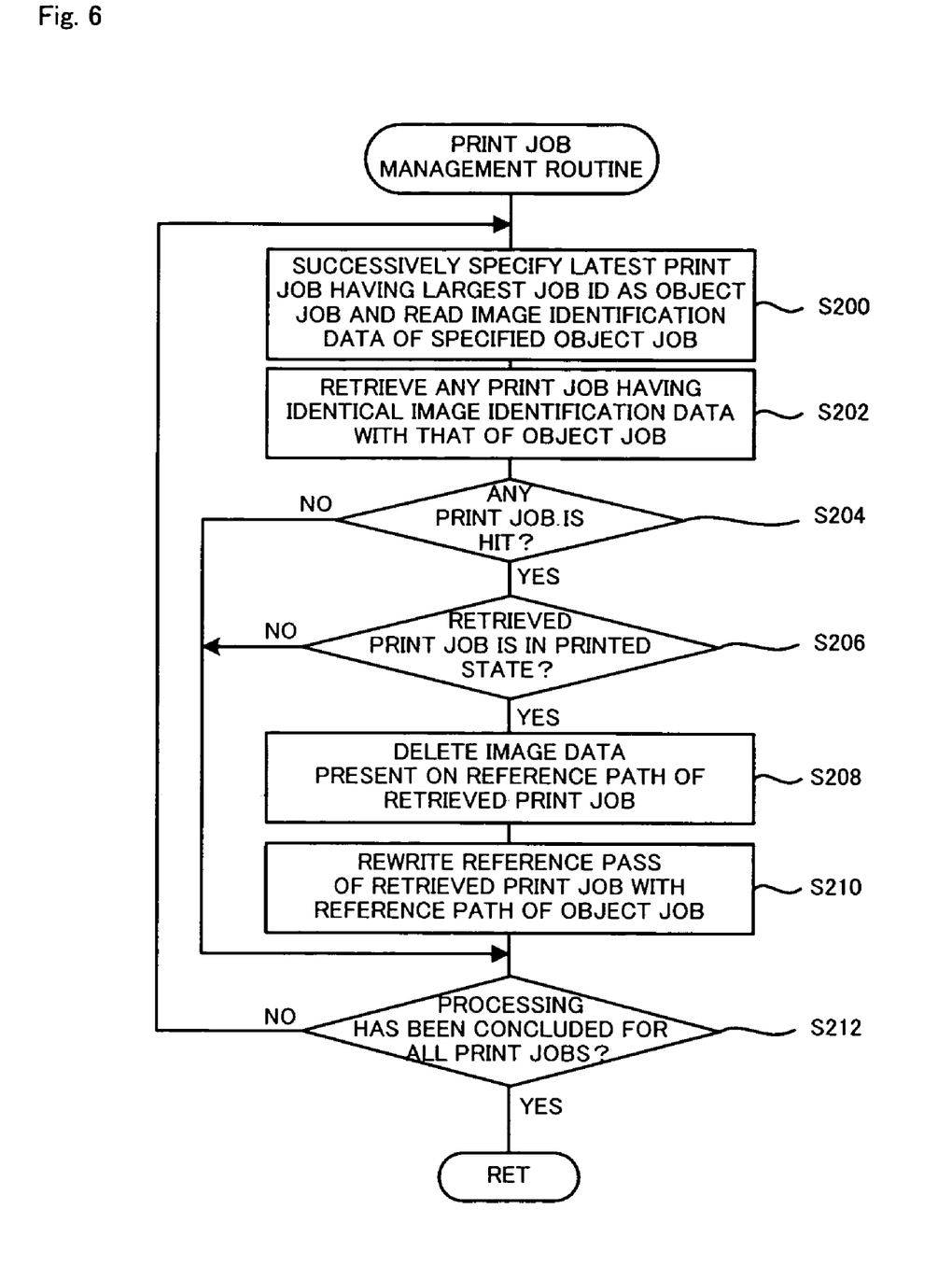
FIG. 6 is a flowchart showing a print job management routine.

The processing of steps S208 and S210 is skipped when no print job having the identical image identification data is hit as a result of retrieval at step S204 or when the retrieved print job is not in the printed state at step S206. The routine of steps S200 to S210 is repeated until the processing has been completed for all the print jobs. When the processing has been completed for all the print jobs (step S212), the CPU 21 exits from the print job management routine.

The print job deletion routine is executed repeatedly at preset time intervals (for example, at every 24 hours). When the print job deletion routine shown in the flowchart of FIG. 8 starts, the CPU 21 of the print server 20 of the embodiment reads the job acceptance dates from the print management files of all the print jobs stored in the job folder 28a (step S300) and determines whether there is any print job having the job acceptance date that is a preset number of days (for example, 30 days) behind the current date (step S302). When there is any print job having the job acceptance date that is the preset number of days behind, the CPU 21 determines whether the relevant print job is in the printed state (step S304). When the relevant print job is in the printed state, the CPU 21 deletes the relevant print job (step S306) and exits from the print job deletion routine. A concrete procedure of deletion of a relevant print job deletes a corresponding image file and a corresponding print management file with a key of the job ID allocated to the relevant print job having the job acceptance date that is the preset number of days behind. For example, it is assumed that a print job with a job ID '1020' is deleted from the state of FIG. 7. The deletion process deletes a folder '1020' corresponding to the job ID '1020' and storing image data 'aaaa.tif' and a print management file '1020.JOB' corresponding to the job ID '1020'. In the case where the corresponding image file has already been deleted by the print job management routine of FIG. 6, the deletion process deletes only the corresponding print management file with the key of the job ID. As described previously with reference to the print job management routine of FIG. 6, one image file may be shared by a print job originally having the image file as well as another print job. The print job management routine of FIG. 6 leaves the image data of a latest print job (that is, a print job having a largest job ID number) among the redundant image data, while the print job deletion routine of FIG. 8 preferentially deletes the image data of a print job stored earlier in the job folder 28a (that is, a print job having a smaller job ID number). The process of deleting the print job with the key of the job ID accordingly does not mistakenly delete the image data shared by multiple print jobs. When there is no print job having the job acceptance date that is the preset number of days behind the current date at step S302, the CPU 21 immediately exits from the print job deletion routine.

As described above, the print server 20 of the embodiment retrieves any print job having identical image identification data for identifying image data with the image identification data of an object job, which is successively specified among all the print jobs stored in the job folder 28a, deletes the image data of the retrieved print job, and overwrites the reference path of the retrieved print job with the reference path of the object job. This arrangement desirably eliminates redundancy of image data and saves the storage capacity of the job folder 28a. The print job with the deleted image data is executable by referring to the image data of the object job. The image identification data including the name of an image file, the size of image data, the camera ID, and the date of photographing is used for retrieval of any print job having the redundant image data. This ensures retrieval of redundant image data with high accuracy.

When redundant image data are present in the job folder 28a, the print server 20 of the embodiment leaves the image data of a latest print job (that is, a print job having a largest job ID number) among the redundant image data. This arrangement ensures storage of latest image data in the job folder 28a. The print server 20 also preferentially deletes an older print job (that is, a print job having a smaller job ID number). This arrangement ensures adequate management of print jobs.

Figure 3:
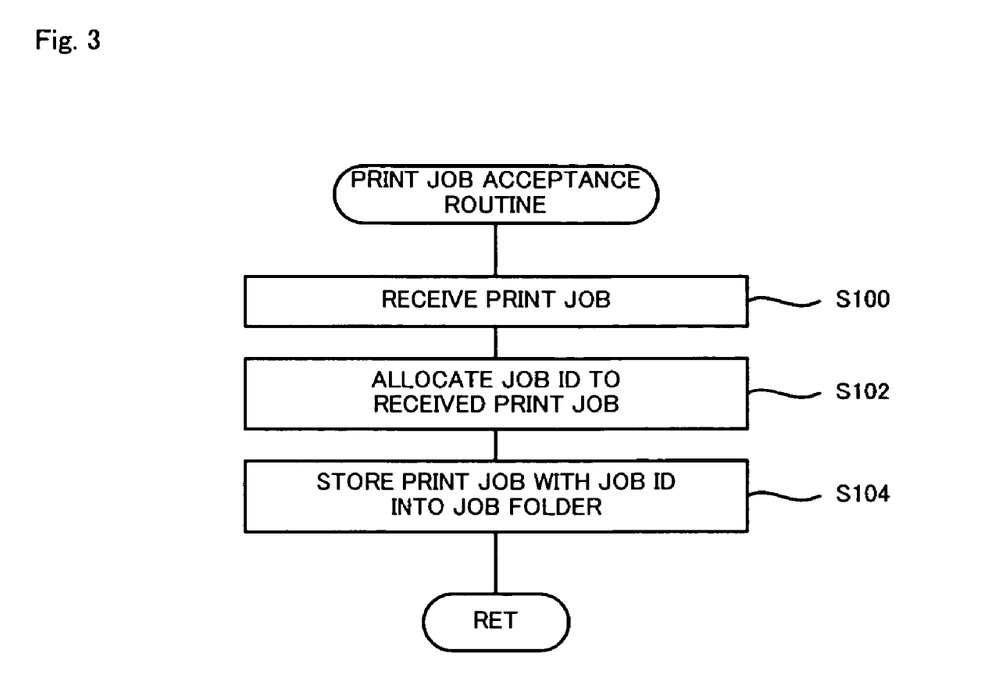
FIG. 3 is a flowchart showing a print job acceptance routine.
Figure 4:
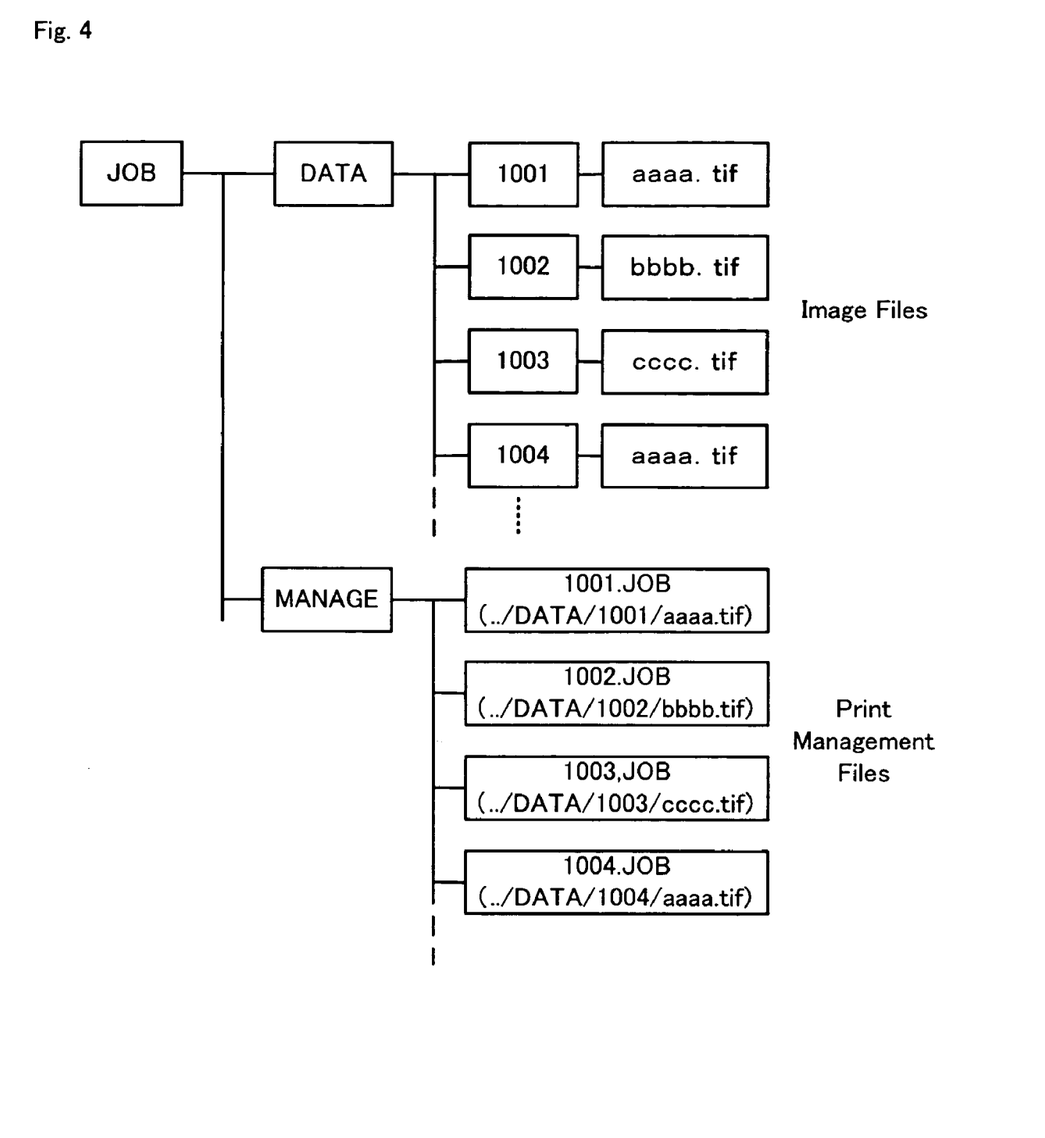
FIG. 4 shows print jobs stored in the job folder 28*a*.

The CPU 21 of the print server 20 of the embodiment executing the print job acceptance routine of FIG. 3 corresponds to the job acceptance module of the invention. The job folder 28a of the hard disk 28 that stores print jobs corresponds to the job storage module of the invention. The CPU 21 of the print server 20 executing the processing of steps S200 through S204 in the job management routine of FIG. 6 corresponds to the redundant data retrieval module of the invention. The CPU 21 executing the process of steps S208 and S210 in the print job management routine of FIG. 6 corresponds to the job status setting module of the invention.

The print server 20 of the embodiment retrieves any print job of redundant image data based on the image identification data, which includes the name of an image file, the size of image data, the camera ID, and the date of photographing. A combination of three or a less number of parameters selected among the name of an image file, the size of image data, the camera ID, and the date of photographing may be used for retrieval of any print job having redundant image data, although the accuracy of retrieval is slightly lowered. A combination of any other parameters may be applied to retrieval of any print job having redundant image data.

The print server 20 of the embodiment deletes the image data of only the print job in the printed state at steps S206 and S208 in the print job management routine of FIG. 6. One possible modification may delete image data of a print job in an execution status other than the printed state, as long as the print job shares the image data of another print job for execution of printing.

The print server 20 of the embodiment executes the print job management routine of FIG. 6 while no print job is executed, that is, when no print job in the print queuing state is present in the job folder 28a. The print job management routine may be executed in parallel with another series of processing, if the print server 20 has marginal processing capacity.

The print server 20 of the embodiment leaves the image data of a latest print job (that is, a print job having a largest job ID number) among the redundant image data in the print job management routine of FIG. 6. This is, however, not restrictive, and image data of another print job may be left instead. In such modification, the reference path of the print job with the deleted image data is overwritten with the reference path of the print job having the remaining image data. In this case, the print job deletion routine of FIG. 8 is to be modified not to delete a print job having image data shared by another print job.

The print server 20 of the embodiment deletes a print job having the job acceptance date that is a preset number of days behind the current date among the print jobs stored in the job folder 28a in the print job deletion routine of FIG. 8. One possible modification may delete a print job when the total number of accepted print jobs reaches a preset level or when the total storage capacity of print jobs reaches a preset volume. In such modification, a print job accepted earlier (that is, a print job having a smaller job ID number) may be deleted preferentially.

In the above embodiment, the technique of the present invention is applied to the print server 20 that functions as a print job management apparatus. The technique of the invention is also applicable to a print job management method in relation to the print job management apparatus of the embodiment. Still another application is a program that causes the computer to function as the print job management apparatus of the embodiment. In the case of such programs, the respective steps of the print job acceptance routine, the print job management routine, and the print job deletion routine may be programmed in a suitable programming language.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A print job management apparatus that manages print jobs, which are executed by a printing device, said print job management apparatus comprising:
   a job acceptance module that receives each print job with image data;
   a job storage module that has a capacity of storing multiple print jobs received by said job acceptance module with reference paths for reading the image data of the print jobs at a time of executing each print job;
   a redundant image retrieval module that retrieves redundant image data among image data of print jobs stored in said job storage module relative to image data of a single print job received by the job acceptance module;
   a job status setting module that leaves at least one of the redundant image data retrieved by said redundant image retrieval module while deleting the other of the retrieved redundant image data, overwrites a reference path for reading the image data of a print job in which the image data was deleted, with a reference path for reading the image data of a print job having the remaining image data among the multiple print jobs having the redundant image data, and sets a status of the print job in which the image data was deleted, such that the remaining image data among redundant image data is shared by the print job having the remaining image data and print jobs in which the image data was deleted; and
   a job status changing module that changes an execution status of a print job in a printed status among the print jobs stored in said job storage module, from a 'printed status' to a 'print queuing status,' such that the print job in the printed state is to be reprinted by a user's reprinting request,
   wherein each print job includes identification information for identifying the image data, and
   said redundant image retrieval module retrieves image data having identical identification information among the image data of the print jobs stored in said job storage module, as the redundant image data.

2. A print job management apparatus in accordance with claim 1, wherein the identification information includes at least one of a file name of each image data, a size of the image data, identification information for identifying a digital camera used to record the image data, and date of recording the image data with the digital camera.

3. A print job management apparatus in accordance with claim 1, wherein said job status setting module preferentially deletes image data stored earlier in said job storage module, among the redundant image data.

4. A print job management apparatus in accordance with claim 1, wherein said job status setting module preferentially deletes printed image data, among the redundant image data.

5. A print job management apparatus in accordance with claim 1, said print job management apparatus further comprising:
   an image processing module that makes image data of each print job, which is stored in said job storage module, subjected to a preset series of image processing and thereby converts the image data into print data printable by the printing device,
   wherein said redundant image retrieval module and said job status setting module respectively execute the retrieval and the deletion and setting the status of the print job, while said image processing module is not activated.

6. A print job management apparatus in accordance with claim 1, said print job management apparatus further comprising:
   a job deletion module that deletes a print job stored in said job storage module at a preset timing.

7. A print job management apparatus in accordance with claim 6, wherein the preset timing is any of a timing when a total number of print jobs stored in said job storage module reaches a preset level, a timing when a total storage capacity of print jobs stored in said job storage module reaches a preset volume, and a timing when a duration of storage of each print job stored in said job storage module reaches a preset time period.

8. A print job management apparatus in accordance with claim 6, wherein said job deletion module preferentially deletes a print job stored earlier, among the print jobs stored in said job storage module.

9. A print job management method that manages print jobs, which are executed by a printing device, said print job management method comprising the steps of:
   (a) receiving each print job with image data;
   (b) storing the received print job into a job storage module that has a capacity of storing multiple print jobs with reference paths for reading the image data of the print jobs at a time of executing each print job;
   (c) retrieving redundant image data among image data of print jobs stored in said job storage module relative to image data of a single print job received in said step (a); and
   (d) leaving at least one of the redundant image data retrieved in said step (c) while deleting the other of the retrieved redundant image data while deleting the other of the retrieved redundant image data, overwriting a reference path for reading the image data of a print job in which the image data was deleted, with a reference path for reading the image data of a print job having the remaining image data among the multiple print jobs having the redundant image data, and setting a status of the print job in which the image data was deleted, such that the remaining image data among the redundant image data is shared by the print job having the remaining image data and the print job in which the image data was deleted; and
   (e) changing an execution status of a print job in a printed status among the print jobs stored in said job storage module, from a 'printed status' to a 'print queuing status,' such that the print job in the printed state is to be reprinted by a user's reprinting request,
   wherein each print job includes identification information for identifying the image data, and
   said step (c) retrieves image data having identical identification information among the image data of the print jobs stored in the job storage module, as the redundant image data.

10. A print job management method in accordance with claim 6, wherein the identification information includes at least one of a file name of each image data, a size of the image data, identification information for identifying a digital camera used to record the image data, and date of recording the image data with the digital camera.

11. A print job management method in accordance with claim 9, wherein said step (d) preferentially deletes image data stored earlier in the job storage module, among the redundant image data.

12. A print job management method in accordance with claim 9, wherein said step (d) preferentially deletes printed image data, among the redundant image data.

13. A print job management method in accordance with claim 9, said print job management method further comprising the step of:
(f) making image data of each print job, which is stored in the job storage module, subjected to a preset series of image processing and thereby converting the image data into print data printable by the printing device, wherein said step (c) and said step (d) respectively execute the retrieval and the deletion and setting the status of the print job, while said step (f) is not proceeded.

14. A print job management method in accordance with claim 9, said print job management method further comprising the step of:
(g) deleting a print job stored in the job storage module at a preset timing.

* * * * *